(12) United States Patent
Lee

(10) Patent No.: US 6,375,208 B1
(45) Date of Patent: Apr. 23, 2002

(54) COMBINED SKATEBOARD SCOOTER/ EXERCISER

(76) Inventor: Jung Tien Lee, No. 12, Yungta 1st Road, Yung Kang City, Tainin Hsien (TW)

( * ) Notice: Subject to any disclaimer, the term of this patent is extended or adjusted under 35 U.S.C. 154(b) by 0 days.

(21) Appl. No.: 09/765,415

(22) Filed: Jan. 22, 2001

(51) Int. Cl.[7] .................................................. B62M 1/16
(52) U.S. Cl. ....................... 280/245; 280/220; 280/282; 280/240
(58) Field of Search ............................... 280/242.1, 244, 280/245, 246, 247, 248, 252, 253, 254, 255, 256, 257, 258, 220, 282, 240

(56) References Cited

U.S. PATENT DOCUMENTS

| | | | | |
|---|---|---|---|---|
| 1,309,855 A | * | 7/1919 | Johnson | |
| 1,801,526 A | * | 4/1931 | Neuman, Jr. | |
| 3,829,126 A | * | 8/1974 | Lohr et al. | |
| 3,874,700 A | * | 4/1975 | Lohr et al. | |
| 6,179,307 B1 | * | 1/2001 | Mao | |

* cited by examiner

Primary Examiner—Kevin Hurley
(74) Attorney, Agent, or Firm—Rosenberg, Klein & Lee

(57) ABSTRACT

A combined skateboard scooter/exerciser comprises a handlebar, a front body, a transmission device, a wheel device, and a board. A rear end of the front body is pivoted to the board and includes a slot through which a steering rod extends. The steering rod is attached to the handlebar to move therewith and movable along the slot. The transmission device is engaged with the steering rod and the wheel device such that back and forth movement of the steering rod urges the wheel device to move forward via transmission by the transmission device. The wheel device includes wheels attached to front and rear ends of the board. The user may stand on the board and operate the handlebar and the steering rod to move back and forth to thereby move the combined skateboard scooter/exerciser forward while achieving a rowing-like exercise effect.

15 Claims, 10 Drawing Sheets

COMBINED SKATEBOARD SCOOTER/ EXERCISER

BACKGROUND OF THE INVENTION

1. Field of the Invention

The present invention relates to a combined skateboard scooter/exerciser, and more particularly to a skateboard scooter that can also be sued as an exerciser for the user to perform rowing-like exercise while moving the skateboard scooter forward.

2. Description of the Related Art

In order to provide an exercise effect, a wide variety of exercisers have been developed. Some of them are fixed in place, such as treaders, universal gyms, etc., and the others are mobile, such as bicycles, skates, skateboards, skateboard scooters, etc. In a typical bicycle or skateboard scooter, front and rear wheels are attached to a frame or board thereof and a handle is provided to control the moving direction, and it is moved by the user's legs. The upper body of the user is not exercised, and such an exerciser is not suitable for people that are handicapped in legs.

SUMMARY OF THE INVENTION

It is an object of the present invention to provide a skateboard scooter that can also be sued as an exerciser for the user to perform rowing-like exercise.

A combined skateboard scooter/exerciser in accordance with the present invention comprises a handlebar, a front body, a transmission device, a wheel device, and a board. The front body has a rear end pivoted to the board, the front body including a slot through which a steering rod extends. The steering rod has an upper end attached to the handlebar to move therewith and movable along the slot. The transmission device is engaged between a lower end of the steering rod and the wheel device such that back and forth movement of the steering rod urges the wheel device to move forward via transmission by the transmission device.

The steering rod is telescopic. The front body includes an upper body portion and a swivel seat, the slot being defined in the upper body portion and including two end edges for limiting the back and forth movement of the steering rod. The swivel seat is pivotally connected to the upper body portion by a first pin. In addition, means is provided for releasably securing the upper body portion and the swivel seat together. The swivel seat is pivotally connected to a front end of the board.

The transmission device includes a transmission block and a transmission wheel. The transmission block includes a first end securely engaged with the lower end of the steering rod and pivotally connected with the upper body portion. The transmission block further includes a toothed second end for meshing with the transmission wheel. The transmission wheel includes an outer tubular member and an inner member. The outer tubular member includes an outer peripheral teeth for meshing with the toothed second end of the transmission block and an inner peripheral teeth. The inner member includes a central hole for securely receiving a front axle rod. The wheel device includes a front wheel securely mounted around the front axle rod to turn therewith. The inner member further includes a movable tooth block on an outer periphery thereof. Each of the inner peripheral teeth of the outer tubular member includes an inclined surface and an engaging portion. When the engaging portion of each of the inner peripheral teeth of the outer tubular member moves toward the tooth block of the inner member, the inner member is turned. When the inclined surface of each of the inner peripheral teeth of the outer tubular member moves toward the tooth block of the inner member, the tooth block is pressed yet the inner member is not turned.

An elastic ring is mounted around the outer periphery of the inner member and bears against an end of the movable tooth block. The outer periphery of the inner member includes an annular flange formed thereon. The outer tubular member includes an annular groove in an inner periphery thereof for receiving the annular flange, and a ball bearing is mounted between the annular flange and the annular groove. A ring is mounted around an end of the inner member to ensure reliable engagement between the inner member and the outer tubular member.

In a modified embodiment of the invention, a post extends upward from the board and a seat is mounted on top of the post. The front body includes two footrests formed thereon. In addition, an adjusting means is provided for adjusting position of the post relative to the board. The adjusting means includes a fixing seat secured to the board, a movable seat slidably mounted to the fixing seat, and a control rod. The post includes a lower end secured to the movable seat to move therewith. The fixing seat includes a plurality of positioning holes. The control rod includes an end pivoted to the movable seat and an engaging portion that is selectively and releasably engaged with one of the positioning holes of the fixing seat. A spring is attached between the control rod and the movable seat to bias the engaging portion to selectively engage with one of the positioning holes of the fixing seat.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
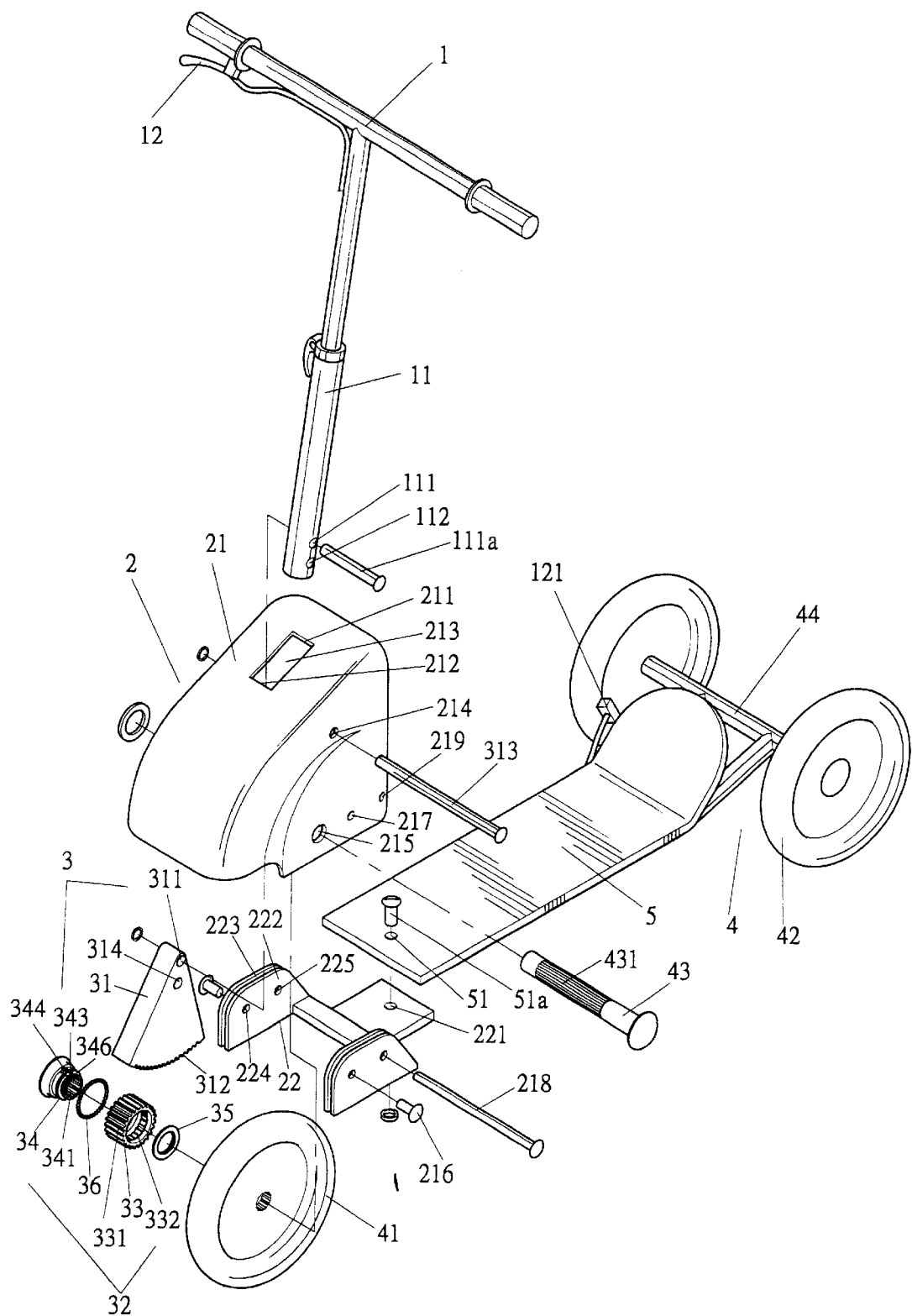
FIG. 1 is an exploded perspective view of a combined skateboard scooter/exerciser in accordance with the present invention.

Referring to FIGS. 1 through 4, a combined skateboard scooter/exerciser in accordance with the present invention generally includes a handlebar 1, a front body 2, a transmission device 3, a wheel device 4, and a board 5.

The handlebar 1 includes a telescopic steering rod 11 attached to a middle thereof The steering rod 11 includes an engaging hole 111 and an axle hole 112 in a lower end thereof for engaging with the transmission device 3. A brake lever 12 is attached to an end of the handlebar 1 to control operation of a braking member 121 for braking, e.g., a rear wheel 42 of the wheel device 4.

The front body 2 comprises an upper body portion 21 and a swivel seat 22. The upper body portion 21 includes a slot 213 in a top thereof through which the steering rod 11 extends. The slot 213 includes two end edges 211 and 212 to limit forward and rearward movements of the steering rod 11 relative to the upper body portion 21. The upper body portion 21 further includes upper aligned holes 214 and lower aligned holes 215, 217, and 219. The swivel seat 22 includes a hole 221 in a rear side thereof, and a pin 51a is extended through the hole 221 and a hole 51 in the board 5 to thereby allow pivotal movement of the swivel seat 22 relative to the board 5. The swivel seat 22 further includes an engaging portion 222 in the form of two opposed side walls having aligned holes 224 and 225, each side wall having a groove 223 therein for receiving a lower edge of an associated side wall of the upper body portion 21. Pins 216 are extended through holes 224 in the side walls of the swivel seat 22 and holes 217 of the upper body portion 21 to secure the swivel seat 22 and the upper body portion 21 together. A pin 218 is extended through holes 225 in the side walls of the swivel seat 22 and holes 219 of the upper body portion 21 to thereby allow pivotal movement of the upper body portion relative to the swivel seat 22 when the pins 216 are removed.

The transmission device 3 includes a sector-like transmission block 31 and a transmission wheel 32. The transmission block 31 is engaged with the lower end of the steering rod 11 by a pin 111a that is extended through the hole 111 of the steering rod 11 and a hole 311 in an upper end of the transmission block 31. The transmission block 31 further includes a further hole 314 in the upper end thereof and a toothed portion 312 in the lower end thereof. A pin 313 is extended through holes 214 in the upper body portion 21 and the hole 314 of the transmission block 31, thereby allowing pivotal movement of the transmission block 31 and the steering rod 11 relative to the upper body portion 21. The transmission wheel 32 includes an outer tubular member 33, an inner member 34, a ring 35, and a ball bearing 36.

Figure 4:
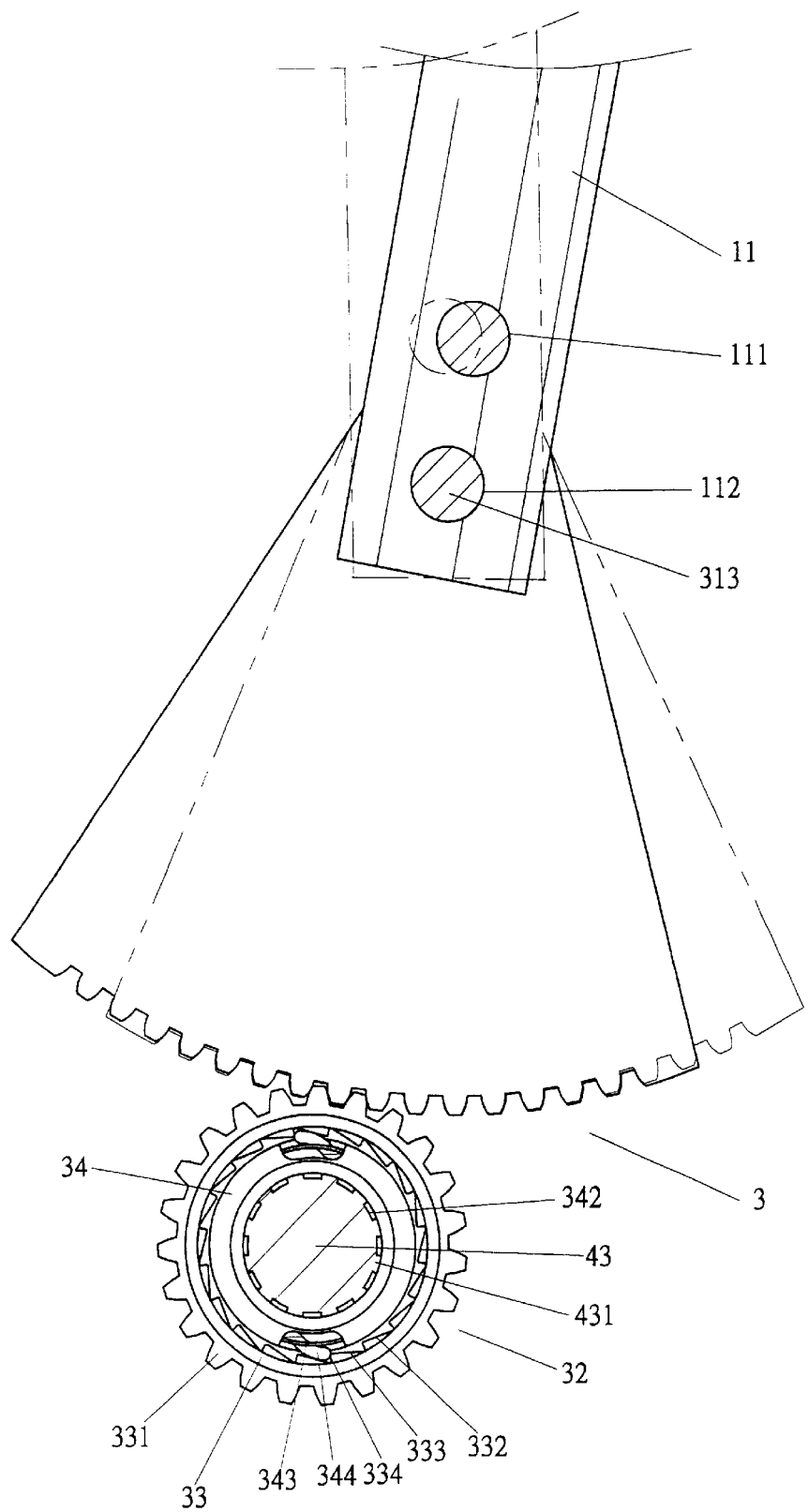
FIG. 4 is a partially sectioned view illustrating operation of the transmission assembly.

The outer tubular member 33 includes an outer peripheral teeth 331 for meshing with the toothed portion 312 of the transmission block 31 and an inner peripheral teeth 332 for engaging with a tooth block 344 of the inner member 34 which will be described in detail later. As illustrated in FIG. 1, each of inner peripheral teeth 332 includes an inclined surface 333 and an engaging section 334, as shown in FIG. 4. The inner periphery of the outer tubular member 33 further includes an annular groove 335 (FIG. 3) for receiving the ball bearing 36.

The inner member 34 comprises a central hole 341 for receiving an axle rod 43 that extends through holes 215 in the upper body portion 21 and a front wheel 41. An inner periphery of the central hole 341 includes keys 342 (FIG. 4) formed thereon. An outer periphery of the inner member 34 includes a movable tooth block 344 thereon and an elastic ring 343 mounted therearound. The elastic ring 343 bears against an end of the movable tooth block 344 and the other end of the movable tooth block 344 is engaged with the engaging portion 334 of the outer tubular member 33. The outer periphery of the inner member 34 further includes an annular flange 345 formed thereon for engaging with the annular groove 335 of the outer tubular member 33 and a threading 346 for threadedly engaging with inner threading (not labeled) of the ring 35. Thus, the inner member 34 is mounted in the outer tubular member 33, and the ball bearing 36 is mounted between the annular flange 345 of the inner member 34 and the annular groove 335 of the outer tubular member 33. The ring 35 is mounted around an end of the inner member 34 to ensure reliable engagement of the inner member 34 with the outer tubular member 33 with the toothed block 344 engaging with the inner peripheral teeth 332 of the outer tubular member 33. Thus, when the engaging portion 334 of each of the inner peripheral teeth 332 of the outer tubular member 33 moves toward the tooth block 344 of the inner member 34, the inner member 34 is turned. When the inclined surface 333 of each of the inner peripheral teeth 332 of the outer tubular member 33 moves toward the tooth block 344 of the inner member 34, the tooth block 344 is pressed yet the inner member 34 is not turned.

The wheel device 4 includes a front wheel 41 rotatably mounted to a the upper body portion 21 by a front axle rod 43 and two wheels 44 rotatably attached to a rear end of the board 5 by a rear axle rod 44. The front axle rod 43 includes a fluted section 431 (FIG. 3) for engaging with the keys 342 of the inner member 34. The front end of the board 5 includes an axle hole 51 for pivotal engagement with the swivel seat 22, as described above.

Figure 2:
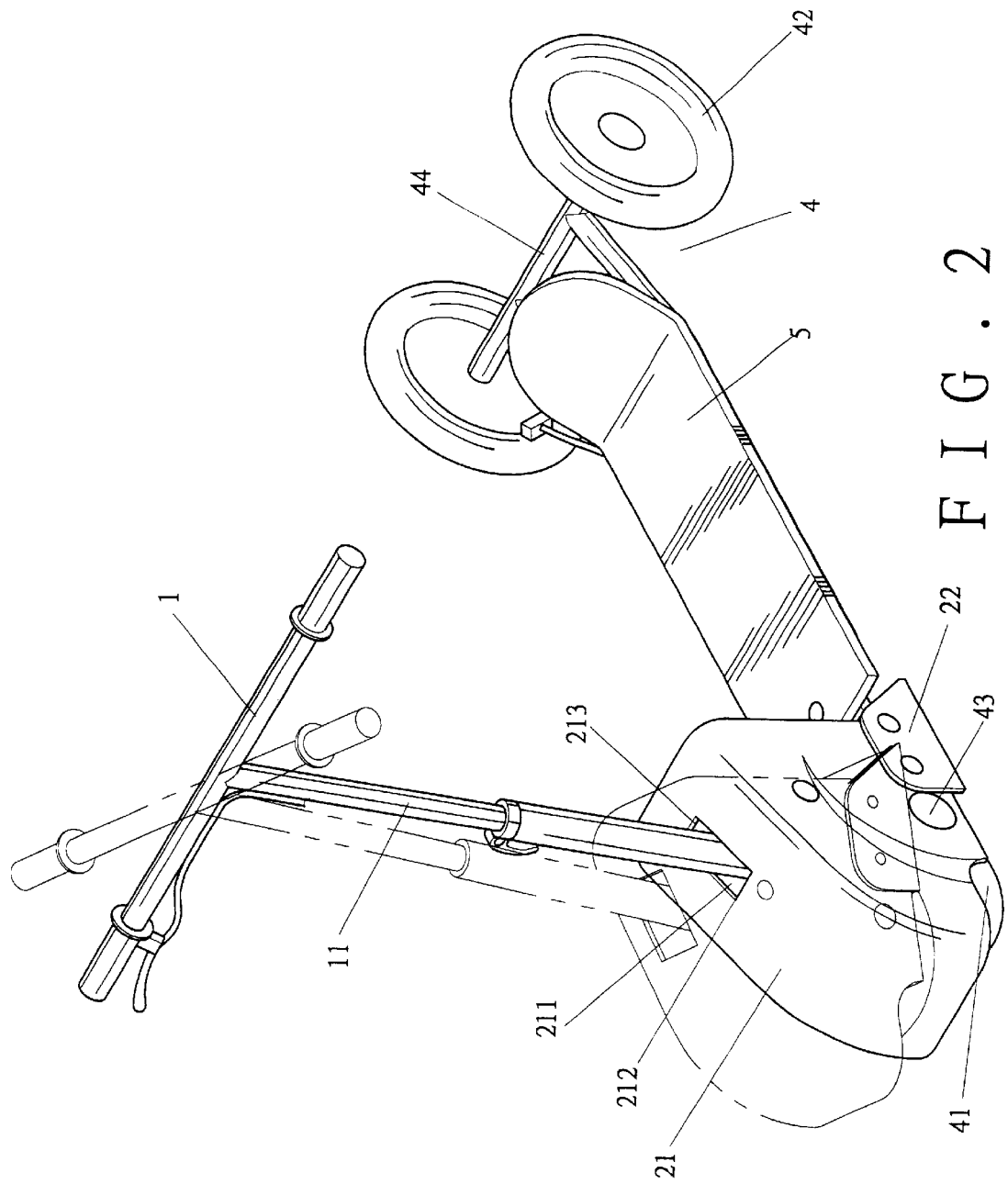
FIG. 2 is a perspective view of the combined skateboard scooter/exerciser in accordance with the present invention, illustrating steering of the combined skateboard scooter/exerciser.
Figure 3:
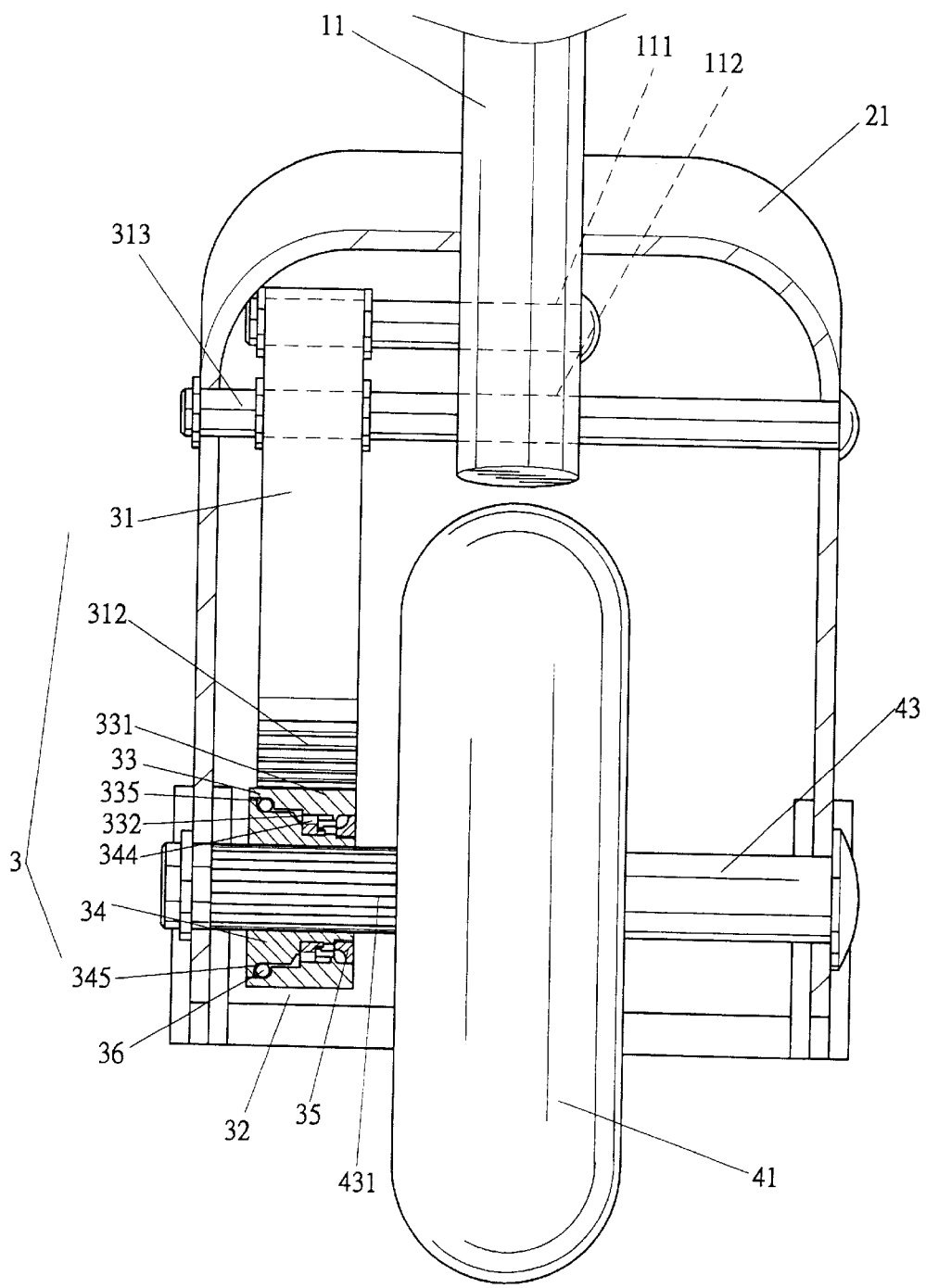
FIG. 3 is a partially sectioned elevational view of a transmission assembly of the combined skateboard scooter/exerciser in accordance with the present invention.
Figure 5:
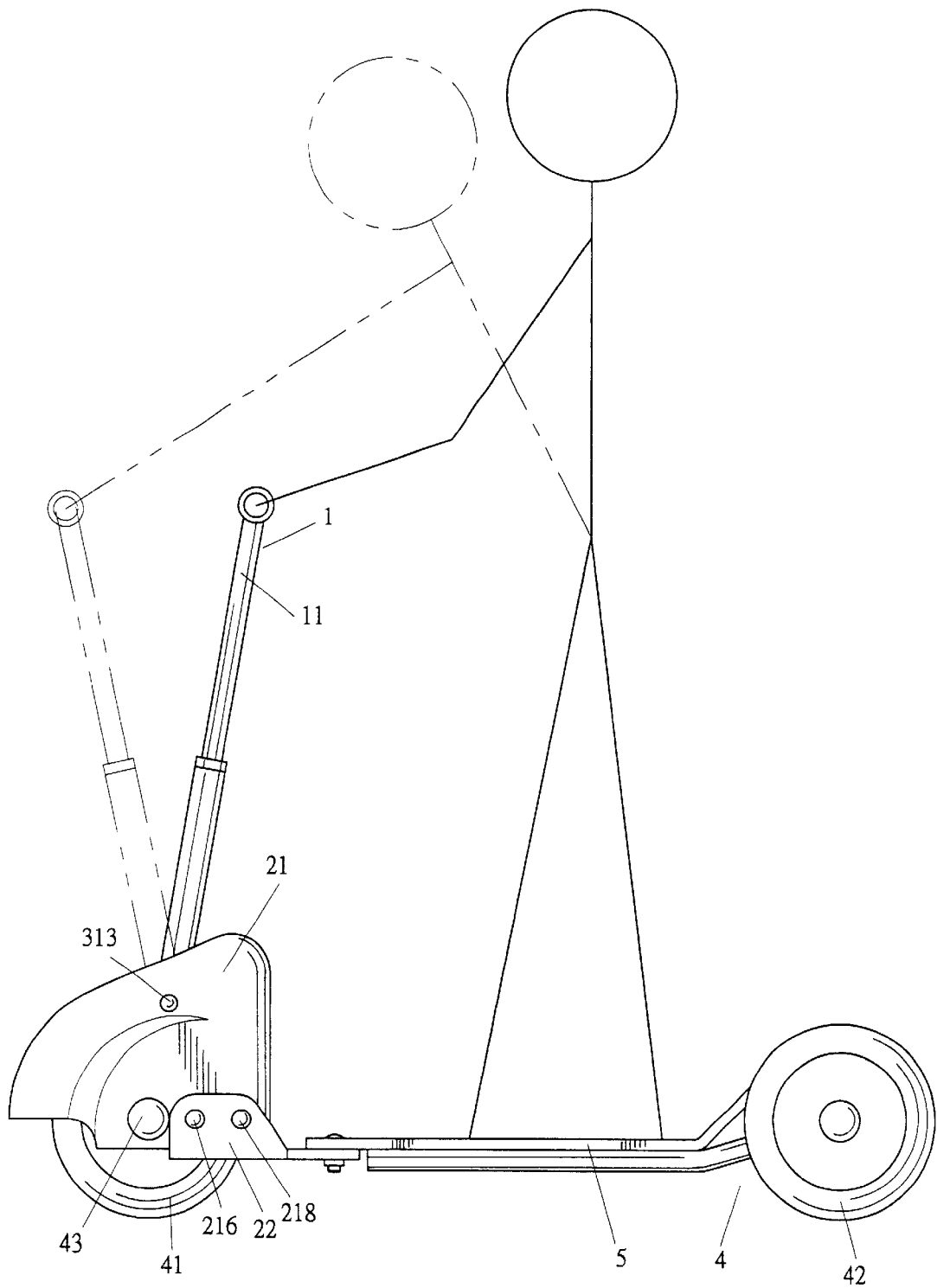
FIG. 5 is a schematic side view illustrating operation of the combined skateboard scooter/exerciser in accordance with the present invention.

Referring to FIGS. 4 and 5, the user may move handle 1 and the steering rod 11 back and forth such that the transmission block 31 and the transmission wheel 32 move accordingly to thereby move the wheel device 4 forward. When the steering rod 11 is moved rearward, via transmission by the transmission block 31 and the outer tubular member 33 that are meshed with each other, the engaging portion 334 of each of the inner peripheral teeth 332 of the outer tubular member 33 turns the inner member 34 to thereby urge the axle rod 43 and the wheel device 4 to turn forward. When the steering rod 11 is moved forward, the inclined surface 333 of each of the inner peripheral teeth 332 of the outer tubular member 33 presses against the tooth block 344 yet the inner member 34 and the wheel device 4 are not turned. However, the wheel device 4 may keep running forward. Thus, by means of operating the steering rod 11, the user may achieve an exercise effect while using the skateboard scooter as a vehicle. As illustrated in FIG. 2, the user may control the moving direction of the combined skateboard scooter/exerciser by the handlebar 1.

Figure 6:
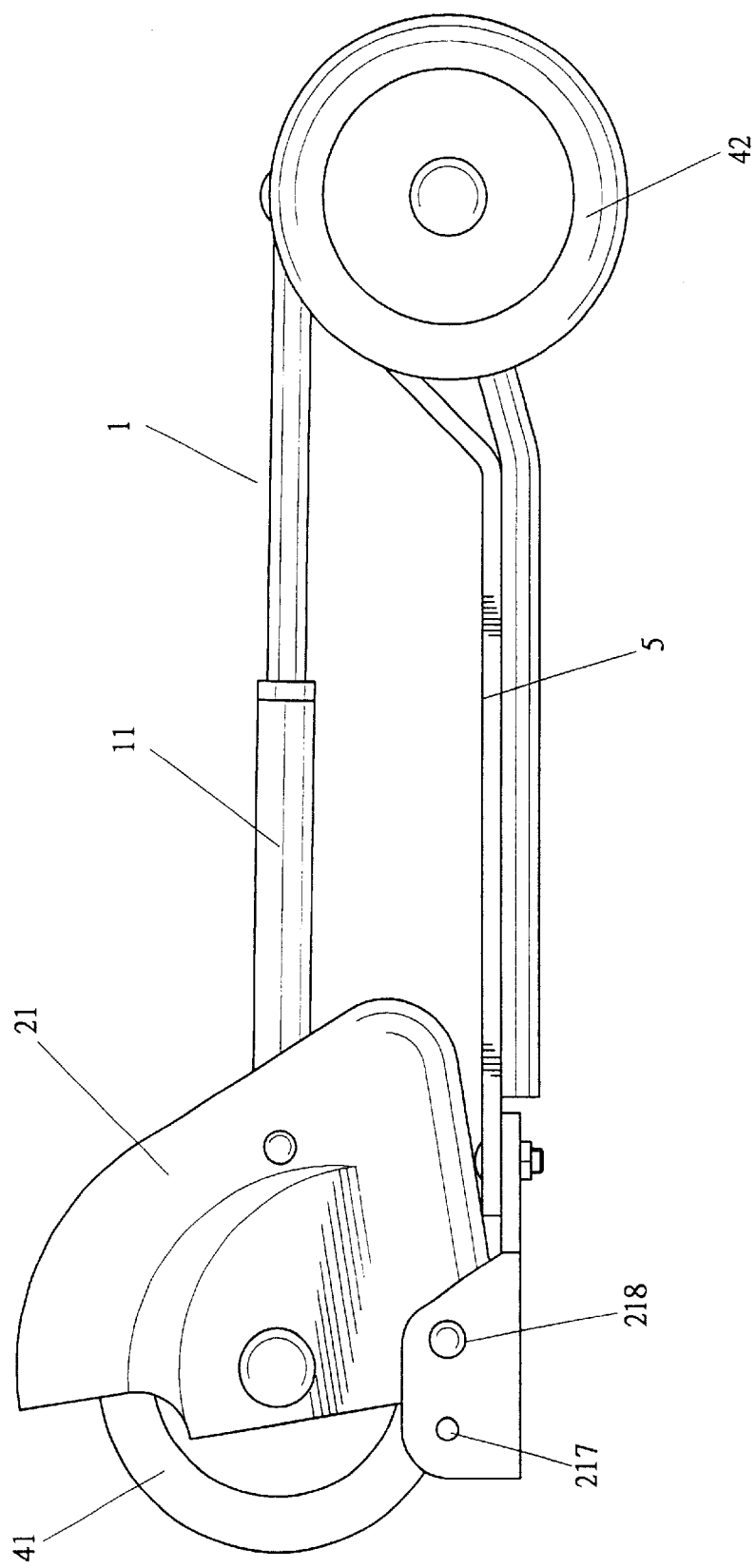
FIG. 6 is a side view of the combined skateboard scooter/exerciser in accordance with the present invention in a folded state.

Referring to FIG. 6, the pins 216 (FIG. 1) may be removed such that the upper body portion 21 may pivot about the pin 218 to a folded state for easy carriage and transport.

Figure 7:
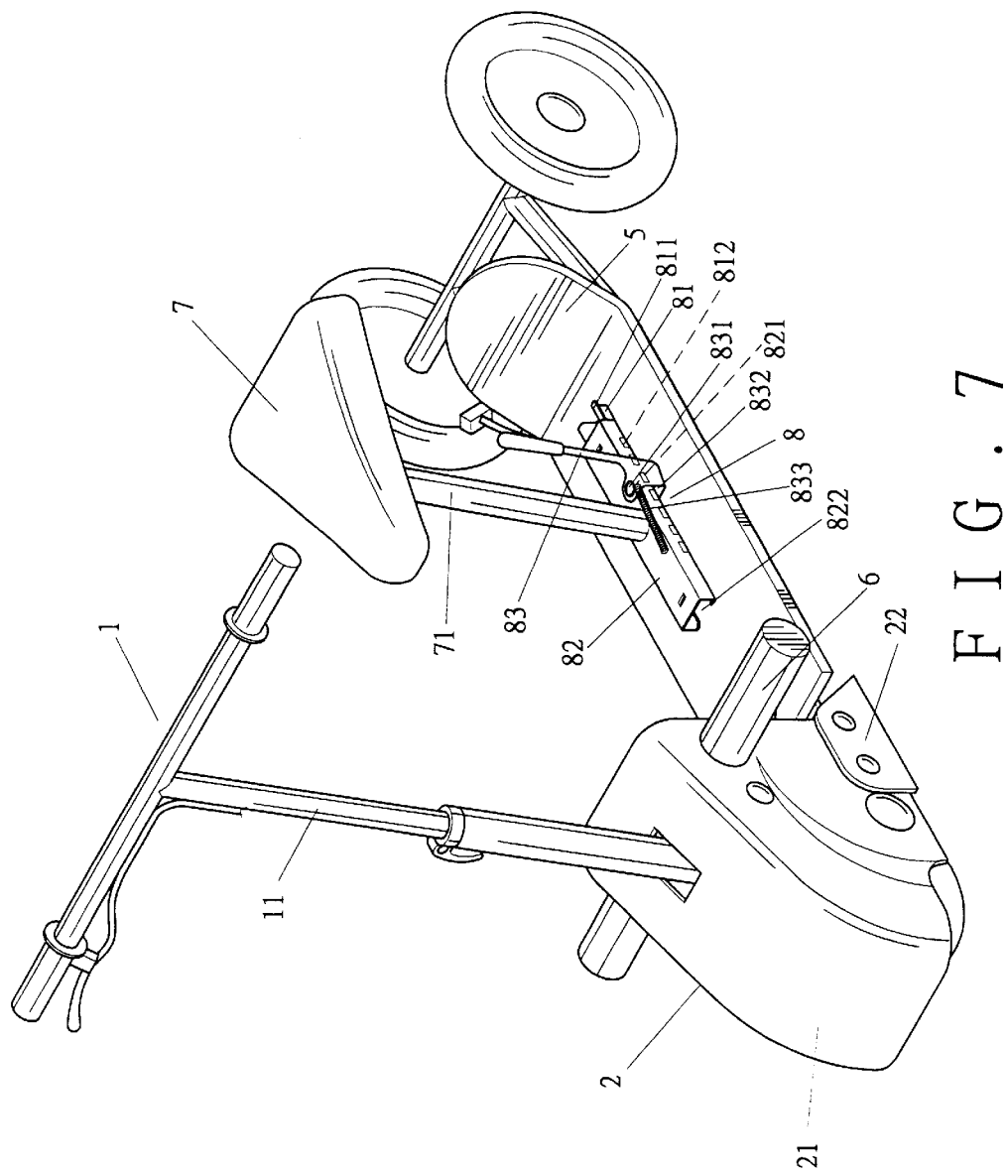
FIG. 7 is a perspective view of a modified embodiment of the combined skateboard scooter/exerciser in accordance with the present invention.
Figure 8:
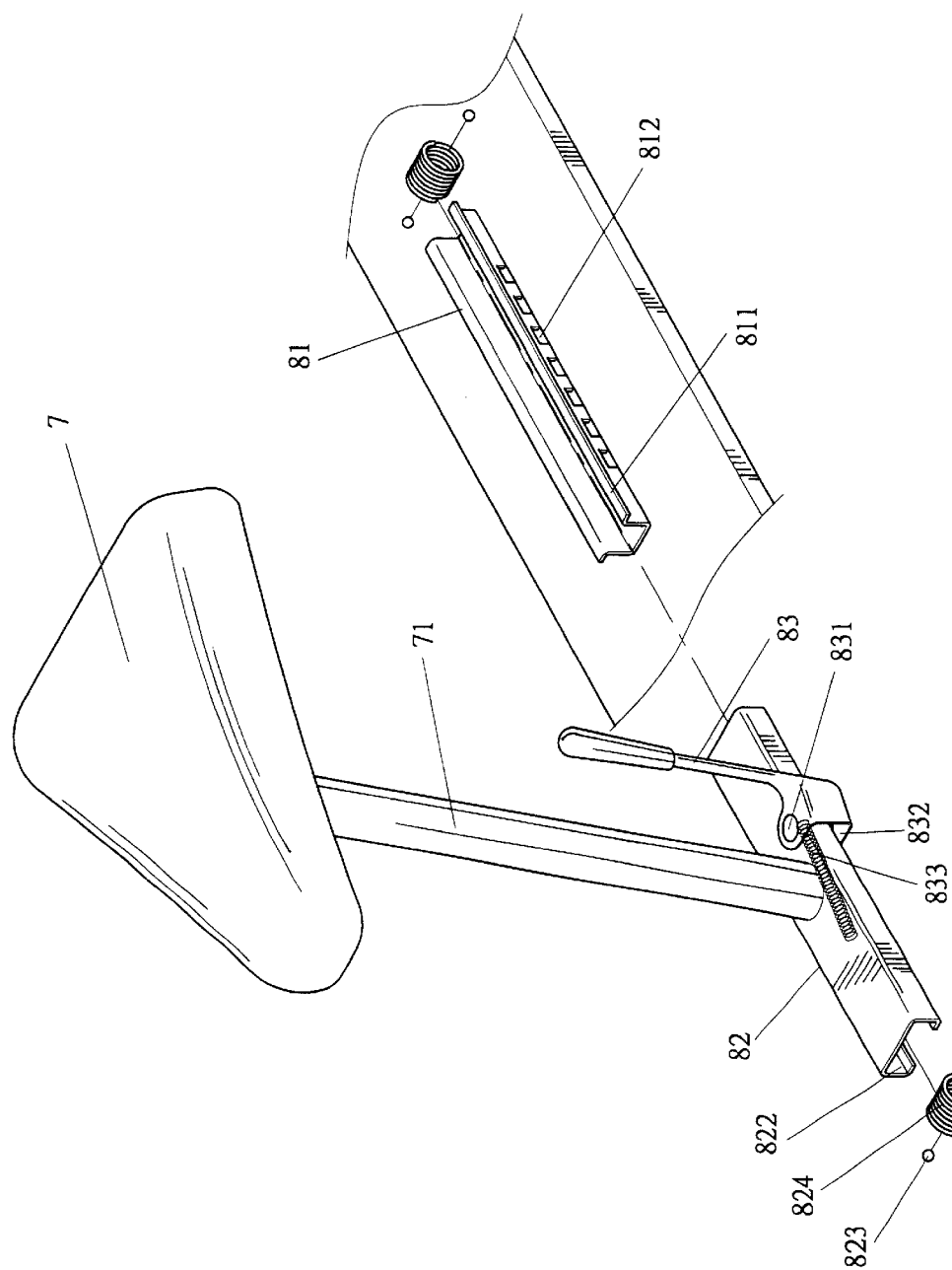
FIG. 8 is an exploded view illustrating an adjusting device of the combined skateboard scooter/exerciser in FIG. 7.
Figure 9:
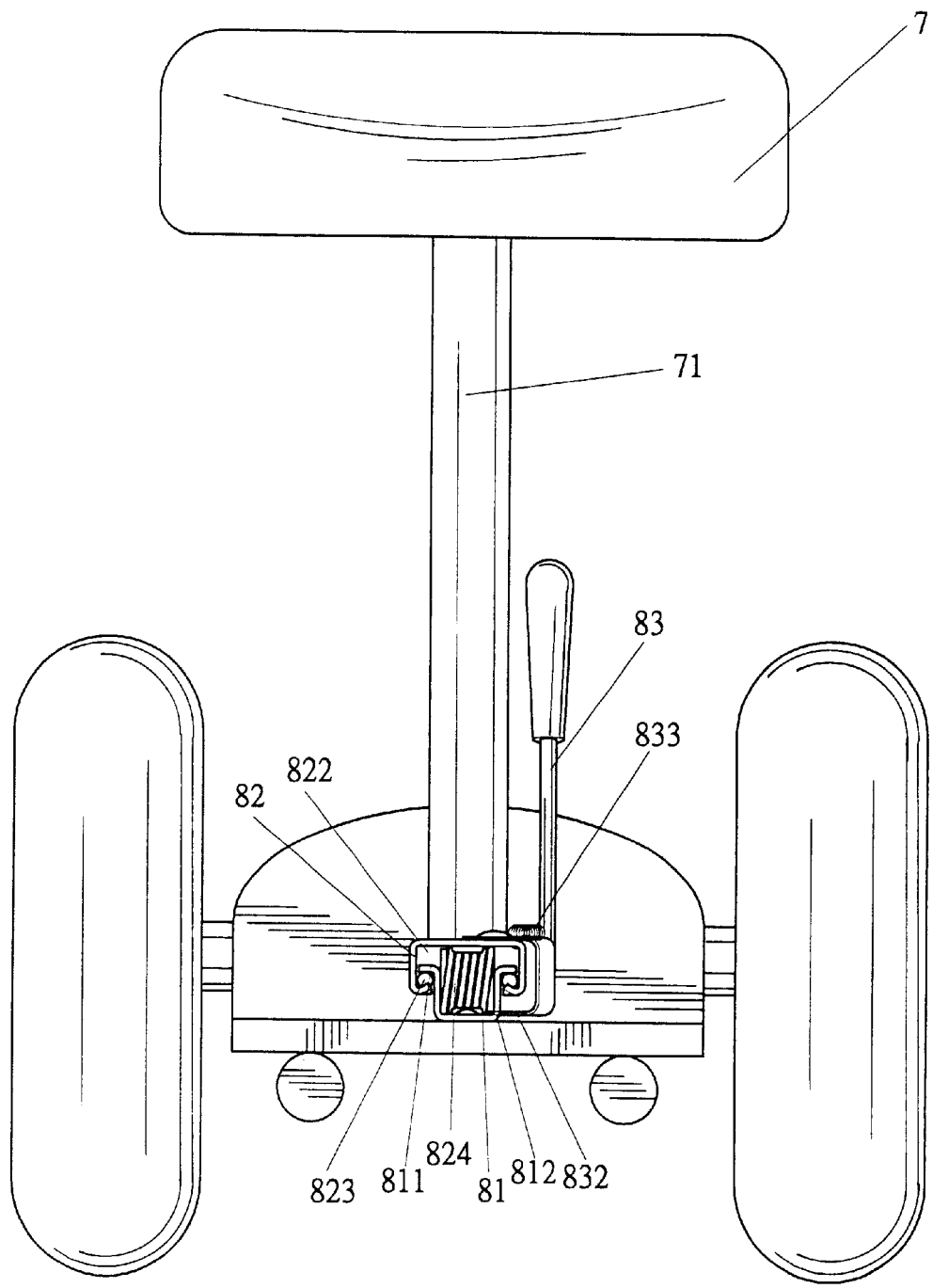
FIG. 9 is a sectional view of illustrating structure of the assembled adjusting device of the combined skateboard scooter/exerciser in FIG. 7.

Referring to FIGS. 7 through 9, in a modified embodiment of the combined skateboard scooter/exerciser, the upper body portion 21 includes two footrests 6 on both sides thereof and a post 71 extends upward from the board 5 with a seat 7 attached to a top of the post 71. An adjusting device 8 is mounted below the post 71 and includes an elongated fixing seat 81, a movable seat 82, and a control rod 83. The fixing seat 81 is substantially U-shape and includes a bottom secured to the board 5 and two side walls each having a lateral wing 811 formed on top thereof. One of the side walls of the fixing seat 81 has a plurality of positioning holes 812 defined therein. The movable seat 82 is substantially inverted U-shape and includes a top secured to a lower end of the post 71. A pivotal hole 821 is defined in the top of the movable seat 82 for pivotal engagement with the control rod 83. Each of two side walls of the movable seat 82 includes an engaging groove 822 for sliding engagement with an associated lateral wing 811. As illustrated in FIG. 9, a receptacle (not labeled) is defined between each engaging groove 822 and an associated lateral wing 811 for receiving a ball 823. A spring 824 is attached between the side walls of the movable seat 82. The movable seat 82 may include recessed portions in end portions and a middle thereof to prevent disengagement of the balls 823 and the spring 824. The control rod 83 has an end with a pivotal hole 831 for pivotal engagement with the movable seat 82. The other end of the control rod 83 includes an engaging portion 832. A spring 833 is attached between the engaging portion 832 and the movable seat 82 for biasing the engaging portion 832 of the control rod 83 to engage with one of the positioning holes 812 of the fixing seat 81. In operation, the user may pivot the control rod 83 to disengage the engaging portion 832 from the positioning holes 812 and then slide the movable seat 82 relative to the fixing seat 81 until the seat 7 is at a proper position relative to the handle 1 and the control rod 83 is then released to reengage the engaging portion 832 with a desired one of the positioning holes 812. Thus, the user may adjust the engaging portion 832 of the control rod 83 to selectively engage with one of the positioning holes 812 of the fixing seat 81 to thereby adjust position of the seat 7. The spring 824 may provide an appropriate resistance during movement of the movable seat 82.

Figure 10:
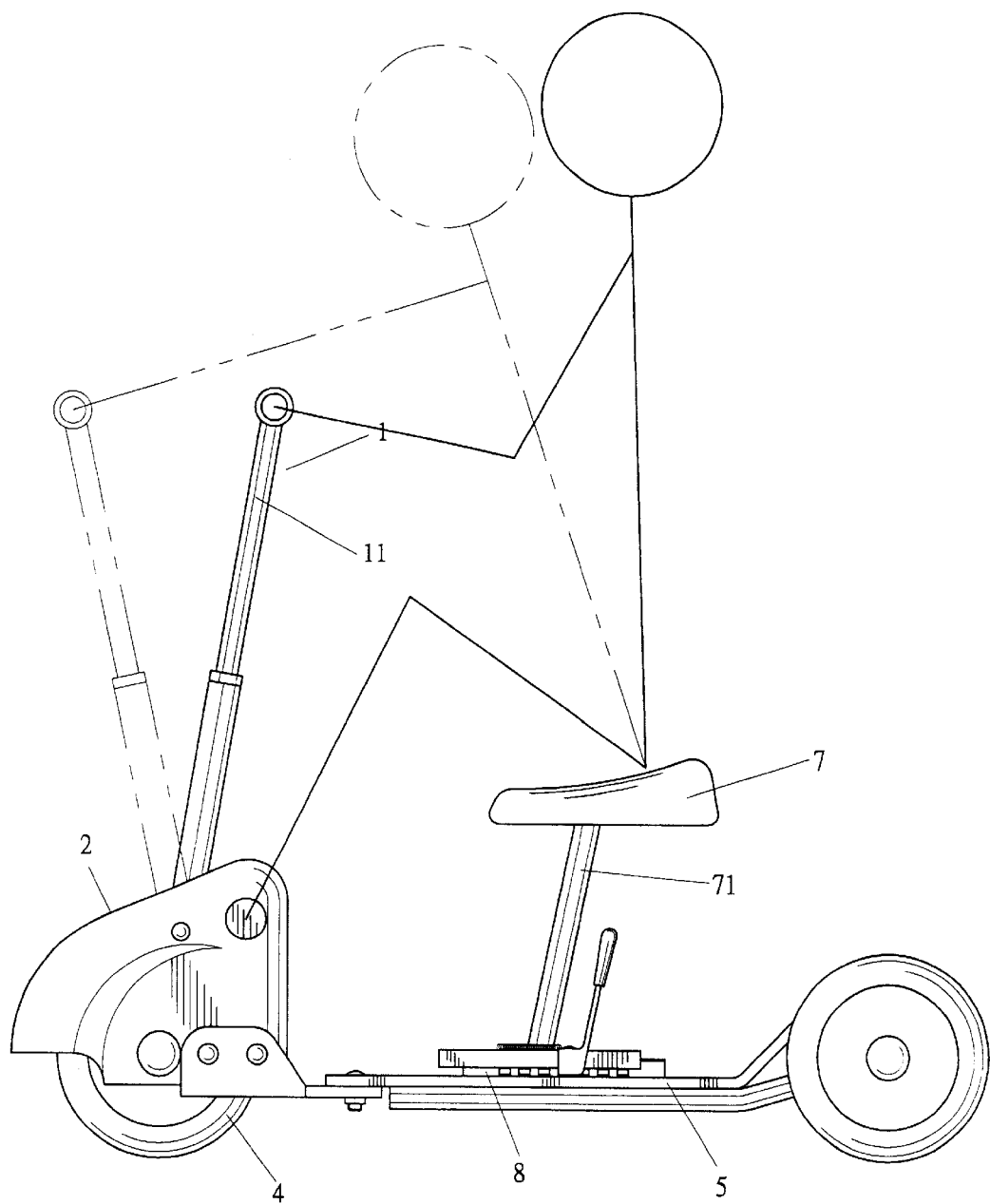
FIG. 10 is a side view illustrating operation of the modified embodiment in FIG. 7.

Referring to FIG. 10, the user may sit on the seat 7 with the feet resting on the footrests 6 and with the hands operating the handlebar 1 to move back and forth to thereby move the combined skateboard scooter/exerciser forward while achieving a rowing-like exercise effect.

Although the invention has been explained in relation to its preferred embodiment, it is to be understood that many other possible modifications and variations can be made without departing from the scope of the invention as hereinafter claimed.

What is claimed is:

1. A combined skateboard scooter/exerciser comprising a handlebar, a front body, a transmission device, a wheel device, and a board, the front body having a rear end pivoted to the board, the front body including a slot through which a steering rod extends, the steering rod having an upper end attached to the handlebar to move therewith and movable along the slot, the transmission device is engaged between a lower end of the steering rod and the wheel device such that back and forth movement of the steering rod urges the wheel device to move forward via transmission by the transmission device.

2. The combined skateboard scooter/exerciser as claimed in claim 1, wherein the steering rod is telescopic.

3. The combined skateboard scooter/exerciser as claimed in claim 1, wherein the front body includes an upper body portion and a swivel seat, the slot being defined in the upper body portion and including two end edges for limiting the back and forth movement of the steering rod.

4. The combined skateboard scooter/exerciser as claimed in claim 3, wherein the swivel seat is pivotally connected to the upper body portion by a first pin, further comprising means for releasably securing the upper body portion and the swivel seat together.

5. The combined skateboard scooter/exerciser as claimed in claim 4, wherein the swivel seat is pivotally connected to a front end of the board.

6. The combined skateboard scooter/exerciser as claimed in claim 3, wherein the transmission device includes a transmission block and a transmission wheel, the transmission block including a first end securely engaged with the lower end of the steering rod and pivotally connected with the upper body portion, the transmission block further including a toothed second end for meshing with the transmission wheel.

7. The combined skateboard scooter/exerciser as claimed in claim 6, wherein the transmission wheel includes an outer tubular member and an inner member, the outer tubular member including an outer peripheral teeth for meshing with the toothed second end of the transmission block and an inner peripheral teeth, the inner member including a central hole for securely receiving a front axle rod, the wheel device including a front wheel securely mounted around the front axle rod to turn therewith, the inner member further including a movable tooth block on an outer periphery thereof, each of the inner peripheral teeth of the outer tubular member including an inclined surface and an engaging portion;

wherein when the engaging portion of each of the inner peripheral teeth of the outer tubular member moves toward the tooth block of the inner member, the inner member is turned; and wherein when the inclined surface of each of the inner peripheral teeth of the outer tubular member moves toward the tooth block of the inner member, the tooth block is pressed yet the inner member is not turned.

8. The combined skateboard scooter/exerciser as claimed in claim 7, further comprising an elastic ring mounted around the outer periphery of the inner member, the elastic ring bearing against an end of the movable tooth block.

9. The combined skateboard scooter/exerciser as claimed in claim 7, wherein the outer periphery of the inner member includes an annular flange formed thereon, the outer tubular member including an annular groove in an inner periphery thereof for receiving the annular flange, and a ball bearing being mounted between the annular flange and the annular groove.

10. The combined skateboard scooter/exerciser as claimed in claim 7, further comprising a ring mounted around an end of the inner member to ensure reliable engagement between the inner member and the outer tubular member.

11. The combined skateboard scooter/exerciser as claimed in claim 1, further comprising a post extending upward from the board, a seat being mounted on top of the post.

12. The combined skateboard scooter/exerciser as claimed in claim 11, wherein the front body includes two footrests formed thereon.

13. The combined skateboard scooter/exerciser as claimed in claim 11, further comprising means for adjusting position of the post relative to the board.

14. The combined skateboard scooter/exerciser as claimed in claim 13, wherein the adjusting means includes a fixing seat secured to the board, a movable seat slidably mounted to the fixing seat, and a control rod, the post including a lower end secured to the movable seat to move therewith, the fixing seat including a plurality of positioning holes, the control rod including an end pivoted to the movable seat and an engaging portion that is selectively and releasably engaged with one of the positioning holes of the fixing seat.

15. The combined skateboard scooter/exerciser as claimed in claim 14, further comprising a spring attached between the control rod and the movable seat to bias the engaging portion to selectively engage with one of the positioning holes of the fixing seat.

* * * * *